INVENTORS
MILO W. SHANER, ROBERT S. CAVE
& DONALD D. ALEXANDER

United States Patent Office 3,548,476
Patented Dec. 22, 1970

3,548,476
MILLING CUTTER CONSTRUCTION
Robert S. Cave, Bay City, Donald D. Alexander, Saginaw, and Milo W. Shaner, Bridgeport, Mich., assignors to Dixie Tool Industries, Inc., Bridgeport, Mich., a corporation of Michigan
Filed Apr. 25, 1969, Ser. No. 819,206
Int. Cl. B26d 1/12
U.S. Cl. 29—103
10 Claims

ABSTRACT OF THE DISCLOSURE

A milling cutter having a cylindrical body provided with a plurality of helical cutting edges circumferentially spaced from one another by helical flutes, each of the cutting edges being interrupted by notches spaced longitudinally of the cutting edge to form cutting teeth. The cutting edges and the flutes spiral about the body in the same direction and at the same pitch, and the notches spiral about the body in the same direction as the cutting edges and the flutes, but at a steeper pitch. The length of the teeth and the notches is substantially uniform and the depth of the notches is such that chips cut by the teeth are discontinuous.

---

Figures 1, 2, 3, 4:
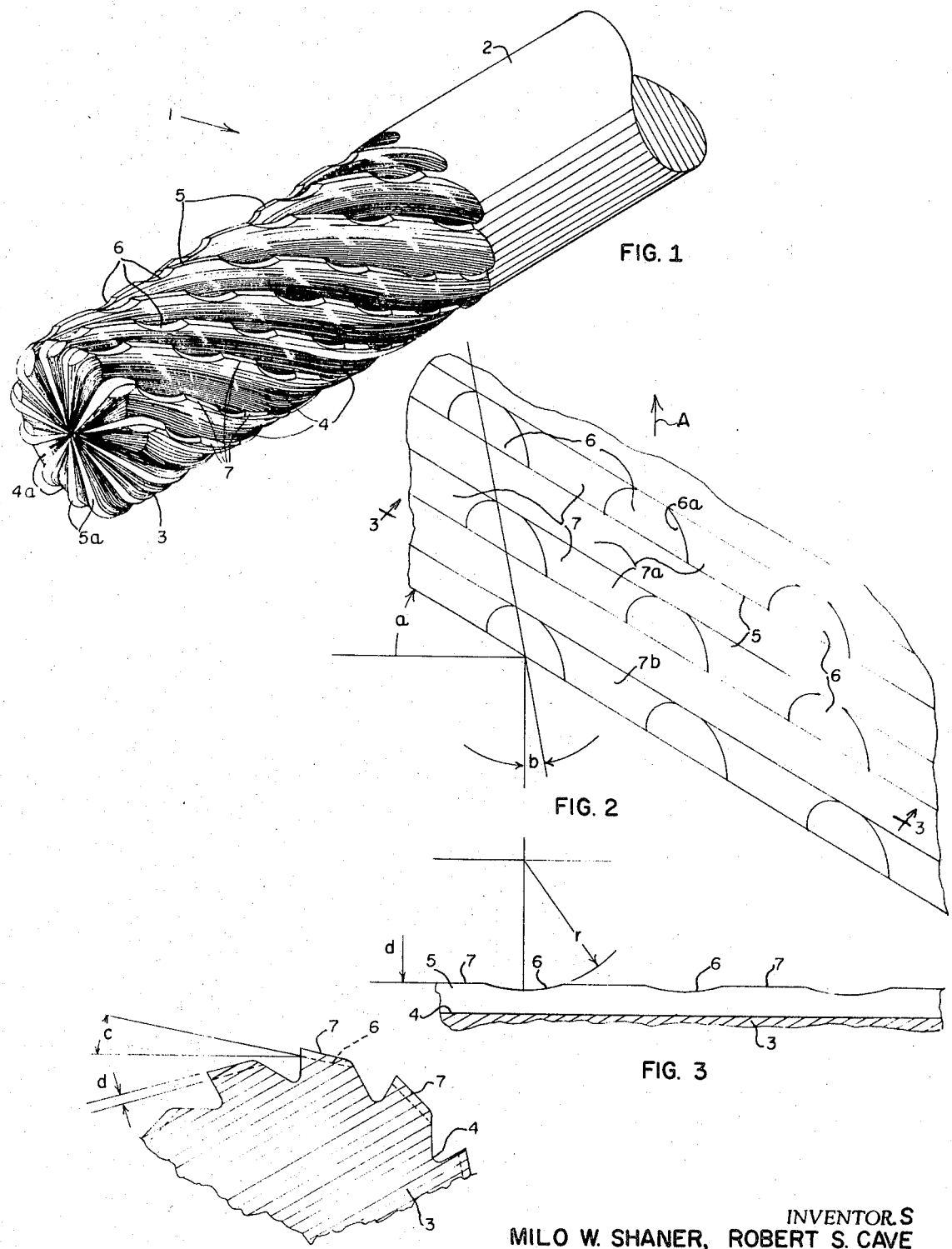

The invention disclosed herein relates to rotary milling cutters and more particularly to a milling cutter constructed in such manner as to enable it to be operated at higher speeds to form a smoother cut and with less pressure and heat generation than is possible with conventional milling cutters.

Milling cutters conventionally include a cylindrical body having a plurality of helical cutting edges circumferentially spaced apart by helical flutes. In some cases the cutting edges are interrupted axially of the body by one or more helical grooves which spiral about the body at either the same or different pitch as the flutes, but in the opposite direction. For example, if the flutes spiral in a right hand direction, the grooves spiral in a left hand direction. In a construction of this kind the grooves enable cutting pressure on the cutter to be relieved somewhat, but the grooves then are disposed in a direction which impedes chip removal. That is, a chip at the leading edge of a cutting tooth defined by a groove normally tends to move toward the shank end of the cutter along the helix of the flute, but if the chip enters the groove, it is urged toward the cutting end of the cutter. As a result, the pressure relief advantages caused by the grooves are dissipated to some extent, the tool operates at a higher temperature, and the smoothness of the cut suffers. In addition, the original grinding and re-grinding of such a tool are complex and expensive.

An object of this invention is to provide a rotary milling cutter which may be operated at either the same or faster speed as conventional milling cutters, but with less cutting pressure and heat generation and without sacrificing any material removal capability.

Another object of the invention is to provide a milling cutter having multiple cutting teeth and wherein chip removal is facilitated.

A further object of the invention is to provide a milling cutter which may be ground and reground quite simply and without necessitating any special equipment.

Another object of the invention is to provide a milling cutter having a greatly improved life in comparison with conventional milling cutters.

A further object of the invention is to provide a milling cutter capable of producing smoother finishes to closer tolerances than is possible with conventional milling cutters.

Other objects and advantages of the invention will be pointed out specifically or will become apparent from the following description when it is considered in conjunction with the appended claims and the accompanying drawings, in which:

FIG. 1 is a fragmentary, isometric view of a milling cutter constructed in accordance with the invention;
FIG. 2 is a fragmentary, developed plan view illustrating the cutting edges, flutes and notches;
FIG. 3 is a fragmentary sectional view taken on the line 3—3 of FIG. 2; and
FIG. 4 is a fragmentary, transverse sectional view.

A milling cutter constructed in accordance with the invention comprises a cylindrical body 1 formed of carbide or other suitable material and having a smooth shank 2 at one end. The opposite end of the body 1 constitutes a cutting end 3 and comprises a plurality of helical flutes 4 of uniform length and depth which form a plurality of helical cutting edges 5 circumferentially spaced from one another by the flutes 4 and which spiral about the axis of the body in the same direction and at the same pitch as the flutes 4. The flutes 4 preferably extend across the cutting end 3 of body 1 toward the axis of latter, as is indicated at 4a, so as to provide end milling edges 5a as is conventional. Each of the cutting edges 5a extends radially of the body and merges smoothly with its associated cutting edges 5 which spirals in a right hand direction about the axis of the body at an angle $a$. The angle $a$ represents the pitch of the cutting edges and may vary from one milling cutter to another, but an angle of 30° has been found to be satisfactory.

The cutting edges 5 are interrupted longitudinally at spaced intervals by a plurality of notches 6. The notches are formed by a groove which spirals about the axis of the body 1 in the same direction as the flutes 4, but at a steeper pitch. The pitch of the notch-forming groove may vary, as will be pointed out hereinafter, but in the disclosed embodiment the pitch of such groove is 79°. The reciprocal of the pitch angle of 79° is 11° and is represented in FIG. 2 as the angle. The notches 6 provide on each of the cutting edges 5 a plurality of longitudinally spaced apart cutting teeth 7.

The grooving tool which forms the notches 6 preferably has an arcuate surface so as to impart to each groove an upwardly concave configuration. Stated differently, each notch 6 is formed on a radius $r$ as is indicated in FIG. 3. The maximum depth $d$ of each notch 6 should be uniform, but the depth $d$ will vary from one milling cutter to another in accordance with certain principles to be referred to hereinafter.

Each of the cutting teeth 7 is flat along its associated edge 5, but is relieved along its trailing edge in accordance with conventional practice, the relief angle $c$ being illustrated in FIG. 4 and having a value of 5° to 7°.

In the disclosed embodiment there are twelve cutting edges 5, but the number of cutting edges 5, the number of cutting teeth 7, the length of each tooth 7 an dthe length or radius of each notch 6 of a given cutter will depend upon several factors. In general, the greater the diameter of the body 1, the greater the number of cutting edges 5 that may be provided. The greater the number of cutting edges, the greater the number of notches 6 and cutting teeth 7 that can be provided. The greater the number of notches 6, the greater can be the pitch of the notch-forming groove. In practice, however, the length of each notch 6 should be no greater than the length of each tooth 7 and, preferably, each tooth 7 should be .004 to .005 inch longer than each notch 6.

The helix on which the notches 6 are formed and the lengths of the notches 6 and the teeth 7 should be so selected that the circumferentially adjacent teeth on successive cutting edges are offset axially from one another by an amount such that each circumferentially successive tooth has a portion which follows a portion of a groove in a preceding cutting edge 5. The amount of offset between successive teeth should be such that, for each complete revolution of the body 1, the teeth trailing any given notch will more than offset the length of the notch. This characteristic of the construction is best illustrated in FIG. 2 wherein one of the notches is identified by the reference character 6a and the succeeding teeth are indicated by the reference characters 7a and 7b. If the tool is moved in the direction of the arrow A, the right hand end of the tooth 7a will follow a portion of the path traversed by the groove 6a, the right hand end of the tooth 7b will follow another portion of the path traversed by the notch 6a, and so on, thereby assuring that the entire length of the path traversed by the notch 6a will be followed by some portion of each succeeding cutting teeth.

The length of the teeth 7, the length of the notches 6, and the number of such teeth and notches formed in each cutting edge will depend on the number of cutting edges 5 which, in turn, depends on the diameter of the body 1. In general, however, the greater the diameter of the body, the greater number of cutting edges can be provided and, consequently, the greater the number of notches and cuttig teeth can be provided.

The depth $d$ of the notches 6 also is related to the diameter of the body 1 and to the number of cutting edges 5 formed thereon. In general, the greater the number of cutting edges 5, the greater can be the depth of the grooves 6 inasmuch as a relatively larger diameter body is sufficiently resistant to deflection to enable each cutting tooth to remove relatively larger, predetermined maximum amount of material from a workpiece. The depth $d$ of each notch 6, however, should be greater than the depth of the cut of the cutting teeth 7, thereby assuring the formation of discontinuous chips.

A cutting tool constructed in accordance with the invention is utilized in the same manner as the conventional cutting tool, but has certain, definite advantages over the latter. For example, the formation of discontinuous chips facilitates chip removal and the spiraling of the notches 6 in the same direction as the flutes 4 further facilitates chip removal. Moreover, the discontinuous cutting teeth 7 results in less drag or resistance to rotation of the tool when it is in operative engagement with a workpiece, thereby reducing deflection of the tool and permitting cutting of the workpiece to closer tolerances than otherwise would be possible. In addition, the utilization of a relatively large number of cutting edges enables the tool to operate at a relatively low temperature, thereby increasing tool life. Further, the large number of cutting teeth, and their being offset from one another axially of the body 1, coupled with the absence of deflection of the tool, makes it possible for the tool to provide a workpiece with a finish which eliminates the necessity of finish grinding in many instances.

When the cutting teeth 7 become dull and need to be reground, they may be reground in the same manner as conventional, fluted milling cutters and by utilization of the same grinding apparatus that is used for the regrinding of such conventional cutters. Should the regrinding of the cutting teeth result in an effective reduction in the depth $d$ of the notches 6, it is a simple matter to grind the notches to a greater depth, thereby producing a reground tool having the same characteristics as the original tool, except for a slightly smaller diameter.

The disclosed embodiment is representative of the presently preferred form of the invention, but is intended to be illustrative rather than definitive thereof. The invention is defined in the claims.

We claim:

1. A cutting tool comprising a body having a plurality of cutting edges spiraling in one direction from one end of said body toward its other end, said cutting edges being circumferentially spaced from one another by grooves spiraling in the same direction and at the same pitch as said edges, each of said edges being interrupted longitudinally of its length by a plurality of notches of uniform depth to form a plurality of teeth on each edge, said notches spiraling at a uniform pitch about said body in the same direction as said edges and said grooves but at a steeper pitch.

2. A tool according to claim 1 wherein the pitch of said notches is such that the teeth on adjacent edges are offset axially of said body, the amount of offset being such that the path traversed by each notch is traversed by a pluraliy of successive teeth.

3. A tool according to claim 1 wherein each of said edges between two adjacent notches is flat.

4. A tool according to claim 1 wherein each of said notches is concave.

5. A tool according to claim 1 wherein the length of each of said teeth corresponds substantially to the length of each of said notches.

6. A tool according to claim 1 wherein each of said teeth is relieved on one side.

7. A tool according to claim 1 wherein each of said notches has a depth such that chips cut by said teeth are discontinuous.

8. A tool according to claim 1 wherein each tooth has a length slightly greater than the length of each notch.

9. A tool as set forth in claim 1 wherein the steepness of the pitch of said notches is directly proportional to the number of cutting edges on said body.

10. A tool as set forth in claim 1 wherein said cutting edges extend across said one end of said body and radiate from the axis thereof.

References Cited

UNITED STATES PATENTS

| | | | |
|---|---|---|---|
| 2,278,738 | 4/1942 | Praeg | 29—103 |
| 2,855,657 | 10/1958 | Erhardt | 29—103 |
| 3,058,199 | 10/1962 | Cave et al. | 29—103 |
| 3,129,492 | 4/1964 | Strasmann | 29—103 |

FOREIGN PATENTS

| | | |
|---|---|---|
| 1,086,815 | 10/1967 | Great Britain. |
| 771,631 | 7/1934 | France. |

HARRISON L. HINSON, Primary Examiner